(12) United States Patent
Savvides et al.

(10) Patent No.: US 10,861,302 B2
(45) Date of Patent: Dec. 8, 2020

(54) ROBUST MOTION FILTERING FOR REAL-TIME VIDEO SURVEILLANCE

(71) Applicant: Bossa Nova Robotics IP, Inc., Pittsburgh, PA (US)

(72) Inventors: Marios Savvides, Wexford, PA (US); An Pang Lin, Mountain View, CA (US); Shreyas Venugopalan, Pittsburgh, PA (US); Ajmal Thanikkal, Pittsburgh, PA (US); Karanhaar Singh, West Windsor, NJ (US); Gavriel Adler, Brookline, MA (US); Kyle Neblett, Brookline, MA (US)

(73) Assignee: BOSSA NOVA ROBOTICS IP, INC., Pittsburgh, PA (US)

( * ) Notice: Subject to any disclaimer, the term of this patent is extended or adjusted under 35 U.S.C. 154(b) by 131 days.

(21) Appl. No.: 16/104,668

(22) Filed: Aug. 17, 2018

(65) Prior Publication Data

US 2019/0057588 A1 Feb. 21, 2019

Related U.S. Application Data

(60) Provisional application No. 62/546,946, filed on Aug. 17, 2017.

(51) Int. Cl.
| | |
|---|---|
| *G06K 9/00* | (2006.01) |
| *G08B 13/196* | (2006.01) |
| *G06T 7/11* | (2017.01) |
| *G06N 20/00* | (2019.01) |
| *G06K 9/40* | (2006.01) |
| *G06T 7/254* | (2017.01) |

(52) U.S. Cl.
CPC ... *G08B 13/19604* (2013.01); *G06K 9/00771* (2013.01); *G06K 9/40* (2013.01); *G06N 20/00* (2019.01); *G06T 7/11* (2017.01); *G06T 7/254* (2017.01); *G08B 13/1961* (2013.01); *G08B 13/19606* (2013.01); *G06T 2207/10016* (2013.01); *G06T 2207/10024* (2013.01); *G06T 2207/20036* (2013.01); *G06T 2207/30232* (2013.01)

(58) Field of Classification Search
CPC ........ G08B 13/19604; G08B 13/19606; G08B 13/1961; G06T 2207/10016; G06T 2207/30232; G06T 2207/10024; G06T 2207/20036; G06T 7/254; G06T 7/11; G06K 9/00771; G06K 9/40; G06N 5/003; G06N 20/00

See application file for complete search history.

(56) References Cited

U.S. PATENT DOCUMENTS

| | | | |
|---|---|---|---|
| 9,704,043 B2* | 7/2017 | Schnittman | B25J 5/00 |
| 2012/0028652 A1* | 2/2012 | Wirola | G01S 5/14 |
| | | | 455/456.1 |

(Continued)

*Primary Examiner* — Amara Abdi
(74) *Attorney, Agent, or Firm* — David R. Stevens; Stevens Law Group (57) ABSTRACT

A video monitoring method that involves determining motion changes in a set of video frames to find potential objects is described. One or more bounding boxes are defined around the potential objects. These bounding boxes are spatially and temporally filtered to eliminate potential object candidates, with only potential objects in the bounding boxes remaining after filtering being classified or identified.

20 Claims, 6 Drawing Sheets

(56) References Cited

U.S. PATENT DOCUMENTS

2015/0245042 A1* 8/2015 Thompson ........... H04N 19/196
 382/166
2017/0337429 A1* 11/2017 Ljungberg ................ G06T 7/11
2018/0374233 A1* 12/2018 Zhou ....................... G06T 7/248

* cited by examiner

ROBUST MOTION FILTERING FOR REAL-TIME VIDEO SURVEILLANCE

CROSS-REFERENCE TO RELATED PATENT APPLICATION

The present disclosure is part of a non-provisional patent application claiming the priority benefit of U.S. Patent Application No. 62/546,946, titled "Description of System of Robust Motion Filtering for Real-time Video Surveillance", filed Aug. 17, 2017.

TECHNICAL FIELD

The present disclosure relates generally to a system for detecting moving objects of interest in a video surveillance environment. In certain embodiments, the system can include cameras mounted on an autonomous robot.

BACKGROUND

Existing camera-equipped security systems can be expensive, often requiring both remote servers to process the captured images and unnecessary human intervention. For example, in a typical object detection application, an object such a moving person is detected in an image by first classifying various image patches across a variety of image scales and then performing an object classification procedure. Unfortunately, such detected image patches can include large number of invalid object detections such as plant motions, environmental noise, and sudden lighting changes. In practice, a great computational cost must often be incurred to allow a system to robustly determine if an object in an image is valid and needs to be classified.

SUMMARY

In one embodiment, a video monitoring method or system includes modules capable of determining motion changes in a set of video frames to find potential objects and define one or more bounding boxes around the potential objects. The bounding boxes can be spatially and temporally filtered to eliminate potential objects, with the remaining potential objects in in the filtered bounding boxes being classified or otherwise identified.

In some embodiments, the bounding boxes are preprocessed to reduce color depth or resolution. In other embodiments, the bounding boxes are first spatially filtered and then temporally filtered. Motion changes can be determined using frame subtraction and/or morphological processing.

Bounding boxes can be created by fitting shape contours, fitting minimum bounding rectangles, or merging adjacent boxes.

Spatially filtering the bounding boxes can include a bounding box shape check, filtering size, filtering aspect ratio, or filtering based on spatial location of the bounding box.

Temporally filtering the bounding boxes can include object motion analysis and object tracking.

In some embodiments, an identified region of interest in a bounding box has its contained potential object classified or identified using machine learning. This can include use of convolutional or recurrent neural networks.

In some embodiments, one or more stationary cameras can be used to acquire the set of video frames. Actuators or movable systems such as trackways can also be used to move a camera to acquire the set of video frames. In some embodiments the camera can be mounted on a vehicle such as an autonomous robot to acquire the set of video frames.

DETAILED DESCRIPTION

Figure 1:
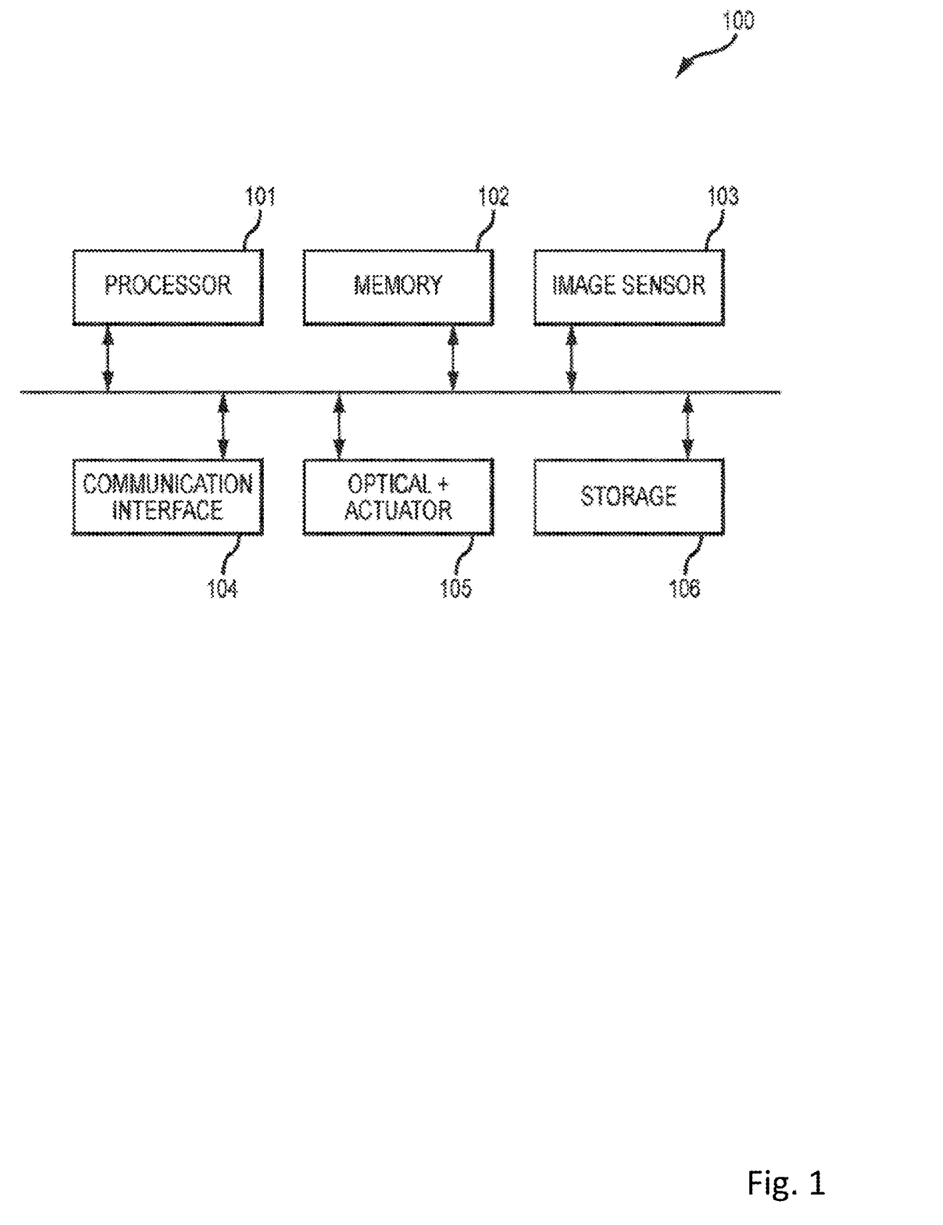
FIG. 1 is a block diagram of exemplary camera system suitable for supported various described processing functions.

FIG. 1 is a block diagram of exemplary camera system 100 that can be used to implement the disclosed system and method. As shown in FIG. 1, camera system 100 may be an "IP camera" (i.e., a camera capable of communicate using the Internet Protocol), a USB camera (i.e., a camera having a Universal Serial Bus interface), or a camera capable of communicating with another device by any suitable means. As shown in FIG. 1, camera 100 includes processor 101, memory 102, image sensor 103, communication interfaces 104, camera optical and actuator system 105, and storage 106. Processor 101 controls the overall operations of the camera, such as operating camera optical and actuator system 105, and communication interfaces 104. Camera optical and actuator system 105 controls the operations of the camera, such as exposure control for image captured at image sensor 103. Camera optical and actuator system 105 may include a fixed lens system or an adjustable lens system (e.g., zoom and automatic focusing capabilities). Camera can be fixedly or movably mounted to point downwardly or upwardly. In certain embodiments a wide field or fish-eye camera can be used. Alternatively, a narrow field, zoomable telephoto camera or a high resolution, tilt controllable, height adjustable camera can be used.

In some embodiments, camera optical and actuator system 105 may include or be associated with an infrared (IR) illumination system (e.g., IR light from light-emitting diodes (LED)) or any suitable illumination system for supplementing light when an environment does not provide sufficient illumination (e.g., at night)). In certain embodiments multiple cameras and/or LEDs can be used to reduce glare from highly reflective surfaces, since multiple cameras pointed in slightly different directions can result in at least one image with little or no glare. Lights can be mounted along with, or separately from, the sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), phosphor supported white LEDs, halogen lamps or another suitable conventional light source. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, both cameras and lights can be movably mounted. For example, hinged, rail, electromagnetic piston, or other suitable actuating mechanisms used to programmatically rotate, elevate, depress, oscillate, or laterally or vertically reposition cameras or lights. In some embodiments, a camera can be mounted to a movable vehicle such and an automobile or autonomous robot.

Image sensor 103 captures images under control of processor 101 from light from the environment entering camera 100. The camera is capable of capturing the images from the environment. Sensor 103 may provide a color image or a grayscale image. In certain embodiments, conventional RGB CMOS or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum to reduce energy consumption and motion blur.

Communication interfaces 104 typically include one or more communication interfaces (e.g., a network interface, a USB interface) which allows image data to be transferred from storage 106 to a communicating external device (e.g., a computer). Storage 106 provides non-volatile storage (e.g., archived images and software). Memory 102 provides run-time memory support for processor 101, such as frame buffers for image processing operations.

According to one embodiment of the present invention, memory 102 may be allocated to include multiple memory spaces. such as a manufacturer's memory space, a developer's memory space, and a user memory space. The manufacturer's memory space may be provided for system software provided by the camera manufacturers, such as firmware for operating camera system 100. The user memory space may be used, for example, for allocating frame buffers for image processing. Frame buffers are typically allocated for holding image data captured by image sensor 103. Such image data may include, for example, frame buffers holding consecutive frames of images. In one embodiment, at least 50 megabytes are allocated for frame buffers in the user memory space for two more consecutive frames of images. The developer's memory space may be used, for example, for holding software modules executed by processor 101 for carrying out a system or a method of the present invention.

Figure 2:
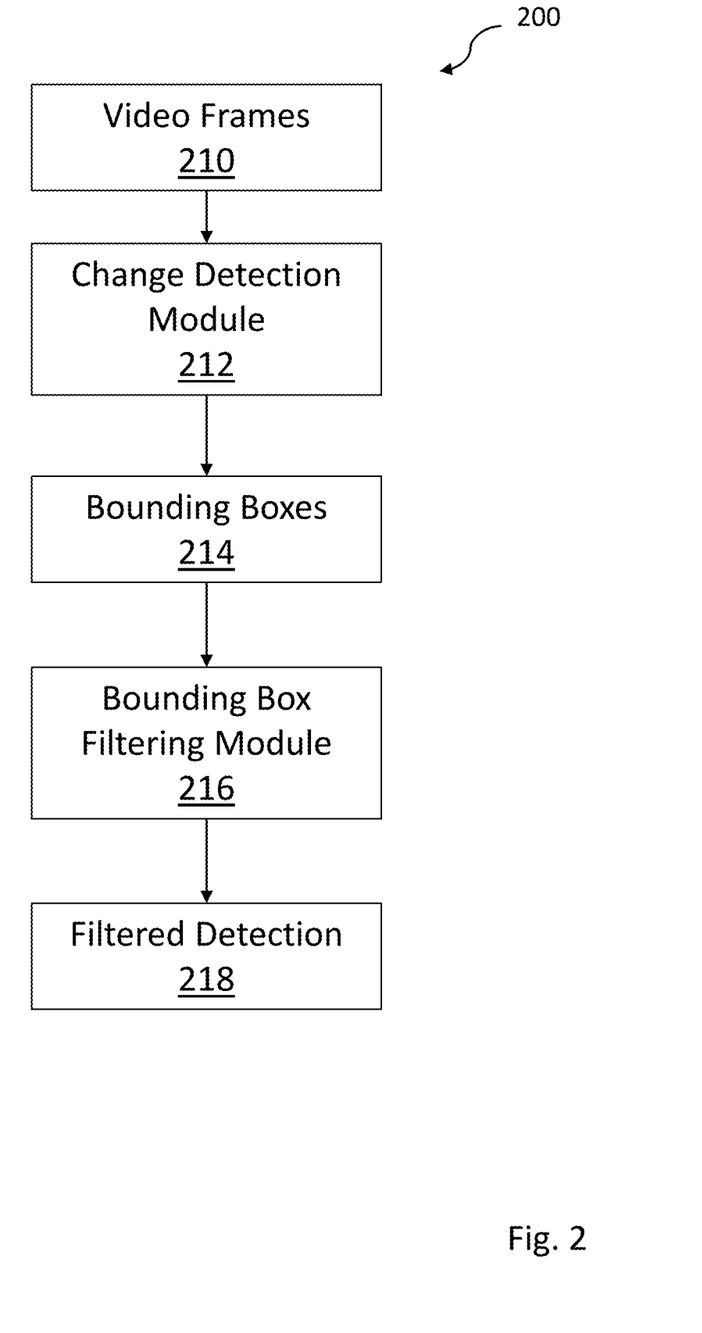
FIG. 2 illustrates one embodiment of a robust motion filtering procedure.

FIG. 2 illustrates one embodiment of an object filtering method 200 utilizable in the disclosed camera system 100. Video frames from camera system 200 are sent to a change detection module 212. Bounding boxes 214 are created to surround potential objects. Instead of immediately classifying objects in the bounding boxes 214, a bounding box filtering module 216 is used to eliminate bounding boxes unlikely to surround objects of interest. The remaining bounding boxes can then have contained objects classified and/or identified in a filtered detection step 218.

In operation, the change detection module 212 takes in a raw frame and produces bounding boxes corresponding to recent changes in the scene. These changes correspond to both valid moving objects and false detections or noise. In one embodiment, an object of interest segmentation algorithm can use a background differentiation approach in order to estimate new objects that have entered the scene. Such an algorithm utilizes the difference between consecutive frames to identify moving objects in the scene. This difference image is then thresholded to determine bounding boxes for potential objects. Since the algorithm does not need to model the background directly, it responds quickly to changes.

The bounding box filtering module 216 performs filtering based on the bounding box properties to remove false detections and keep valid detections. Bounding box classification is necessary in order to determine whether the detected region corresponds to a valid detected object or to irrelevant changes not caused by moving objects (e.g. lighting changes). The algorithm can be trained off-line to learn the decision boundary between valid and invalid objects based on training samples. The features used to discriminate can include combinations of size, aspect ratio, and location of the bounding box within the frame. The feature vector is then fed into a decision tree classification component, which rejects or accepts the bounding box.

Advantageously, computation of any features from actual pixel data is not required by the bounding box filtering module 216, allowing the filtering to be decoupled from the change detection module 212. This feature, along with use of a tree classification procedure that only requires object detection if needed, greatly improves overall computation speed. In effect, valid moving objects can be detected, identified, and tracked against a variety of background by first filtering out nearly all invalid detections such as plant motions, environmental noise, and sudden lighting changes. The described system requires no on-device learning time or adjustment period, unlike conventional background modeling-based approaches.

Figure 3:
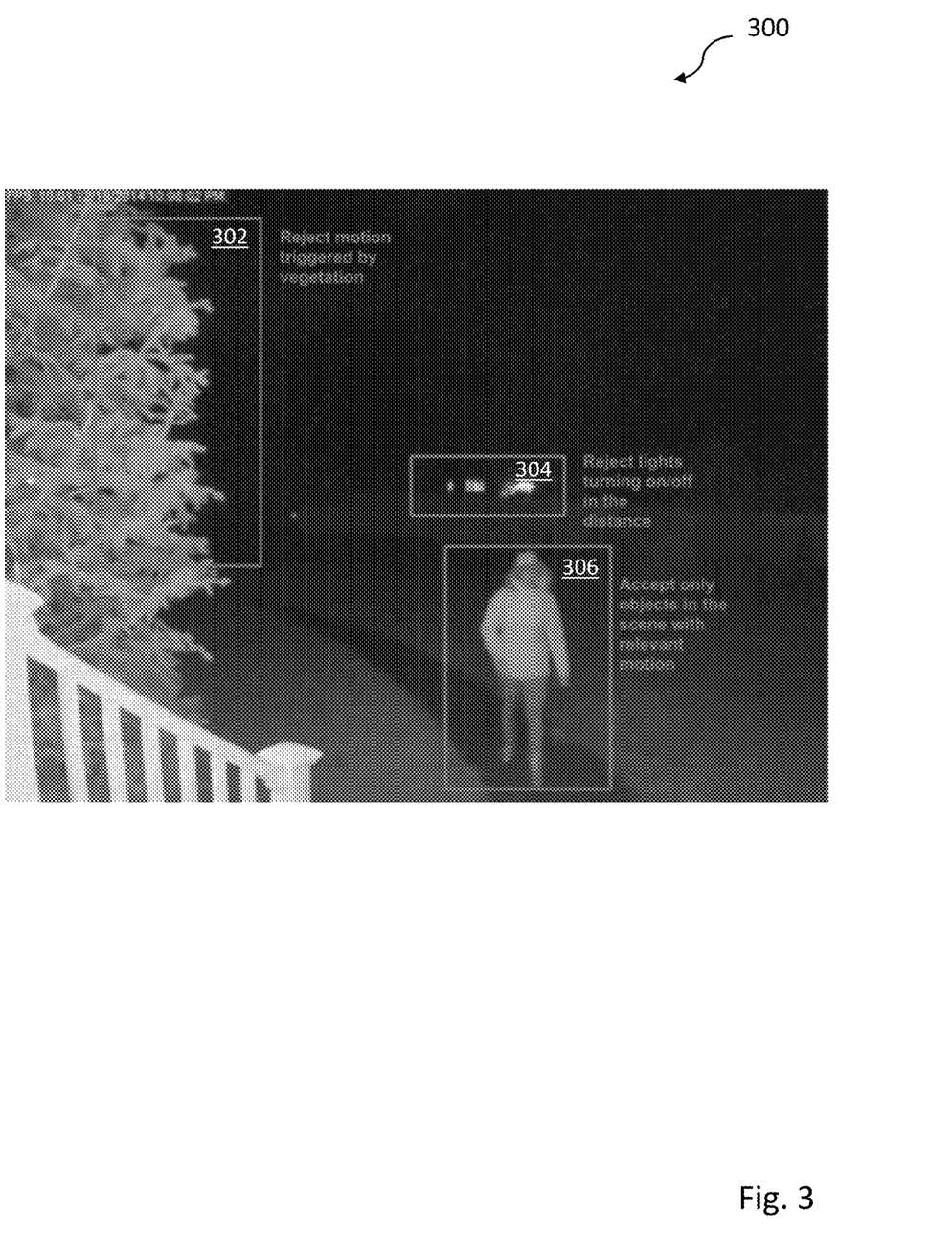
FIG. 3 is representative video frame after analysis.

FIG. 3 is an example scene taken from a video frame and illustrating a variety of invalid objects that do not need object identification and a valid object that does need object identification. Invalid objects include moving tree leaves within bounding box 302 and varying intensity house lights positioned within bounding box 304. A valid object identifiable as a person in found within bounding box 306. The described system of FIG. 2 will filter out bounding boxes 302 and 304 without identifying or classifying the objects contained therein. The computationally expensive step of object identification will only be performed for the object (i.e. a person wearing a hooded jacket) contained in bounding box 306.

Figure 4:
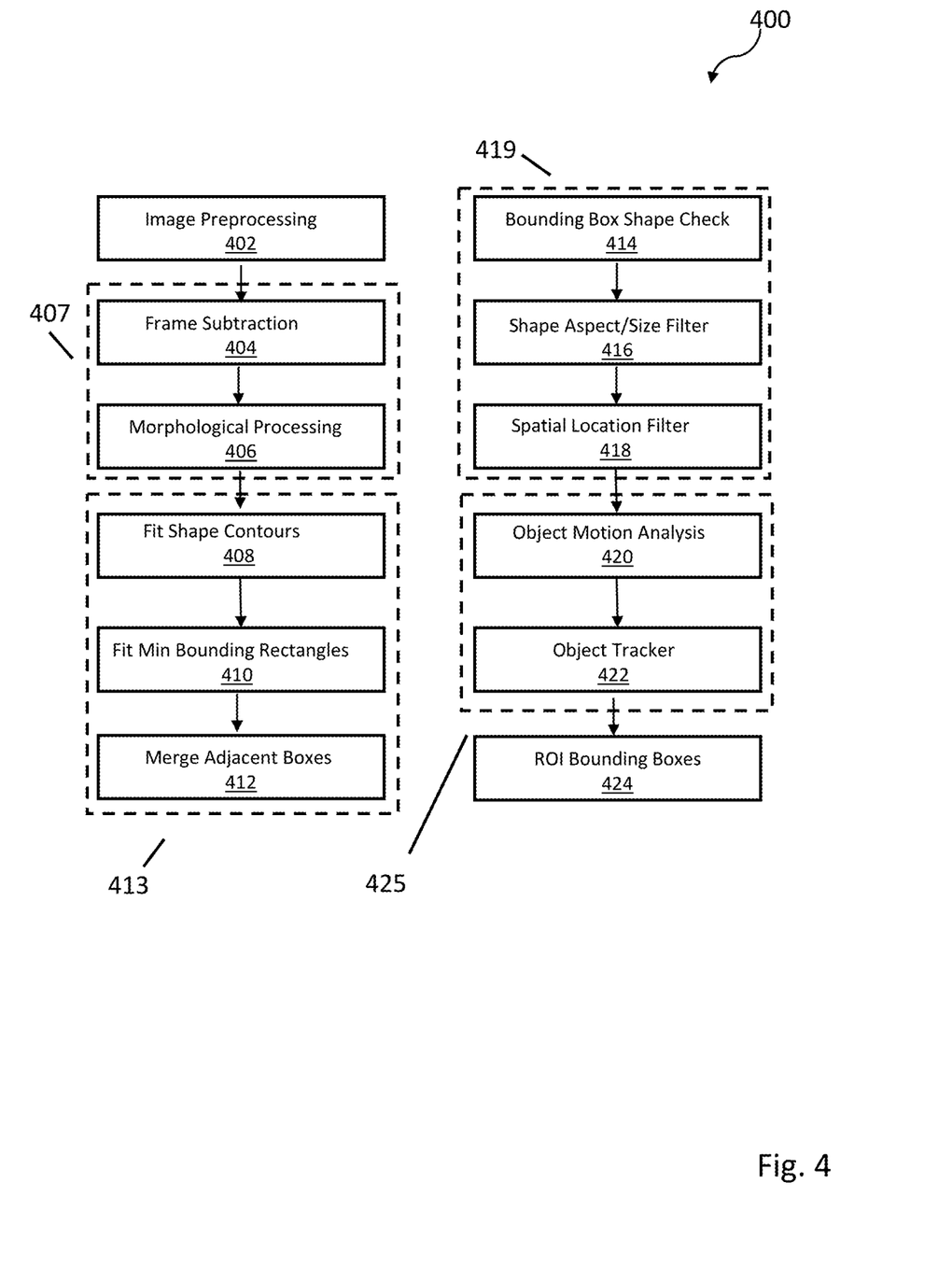
FIG. 4 is an illustration of an embodiment of a robust motion filtering system and method.

FIG. 4 illustrates an embodiment of method 400 suitable for operation on the camera system 100 of FIG. 1. Video frames are subjected to image preprocessing 402 that can include, but are not limited to, blurring, sharpening, downsizing, upsizing, morphological operations including rotation or stretching, and color or wavelength filtering. In some embodiments, color depth of video frame data in the frame buffers can be reduced, for example by conversion color to grayscale. Such a conversion may be carried out in one of numerous ways. For example, image data may be represented by the RGB, the RGBA, or one of many industry standard image data formats under various color space representations. Typically, these data formats are expressed in multiple data channels, with one of the channels used to represent intensity. Alternatively, the intensity of each pixel may be derived from the image data in two or more of the channels. For example, under the RGB format, the intensity is a known weighted average of all three channels. Conversion from image data in industry standard image data to grey-scale data based on intensity is known to those skilled in the art. (Some cameras also provide a separate gray-scale channel for their color pictures.) In some embodiments, down-sampling by 4 (e.g., reduction by a factor of 2 in each dimension of the 2-dimensional image) is achieved by simply sampling every other pixels in each dimension, which enables a potential approximate speedup by a factor of 4.

The resultant image frames are fed into a module 407 that extracts all foreground regions in motion, based at least in part on frame to frame differences. This can be done by frame subtraction 404. Frame subtraction 404 can include, but is not limited to, use of differencing and thresholding to obtain the magnitude of the difference between each pair of corresponding pixels in down-sampled grayscale frames between the first frame and the subsequent frame. This can be followed by a process assigning each pixel in the binary-value frame buffer a binary value "1" when the magnitude of the difference of the corresponding pixels exceeds a predetermined threshold value, and the binary value "0", otherwise. The binary-value buffer thus provides a binary-valued image ("binary image") which roughly shows which pixels changed value significantly between the first frame and the subsequent frame ("in motion"). As the first frame and the subsequent frame contain grey-scale image data, differencing involves only a single subtraction for each pixel. In most cameras, it is sufficient to express each grey-scale pixel by an 8-bit or a 16-bit value.

Morphological processing 406 follows frame subtraction 404 and can involve hole filling, median filtering, and dilation to respectively infill holes, filter a foreground image to reduce noise (median filtering), or add pixels on the object edge (dilation). Dilation can involve use of a Manhattan distance transform and thresholding step to obtain a 4-way connected dilated image. Based on predetermined system connectivity parameters, pixels that are adjacent to the pixels identified to be in motion are "flooded". In one embodiment, the pixels that are flooded are the adjacent pixels within a predetermined distance reachable by taking steps in the 4 orthogonal directions (i.e. x, −x, +y and −y directions). The flooded pixel is set to binary value "1". In one embodiment, the predetermined distance is empirically determined to be between 2 and 6, based on output resolution and system efficiency. Alternatively, a radial dilation may be used. In a radial dilation, all pixels within a predetermined distance are flooded. The resulting is a modified binary image. In this modified binary image, nearby disjointed pixels in motion may form "blobs" that each ideally represents an object in motion.

After processing by module 407, the image (containing various foreground region blobs) is sent to a module 413 to allow for fitting bounding boxes to the extracted foreground regions. This can be done by fitting shape contours 408, followed by fitting minimum sized bounding rectangles 410 to each extracted foreground region.

In one embodiment, fitting a bounding box involves two passes over the binary image, using a simple array to efficiently keep track of equivalences. In the first pass, pixels are identified to be belonging to the same region of motion. In the second pass, each region of motion is associated with a region identification number, and each region of motioned so identified is provided the smallest rectangular bounding box that contains all the pixels within the identified region of motion. A bounding box may be represented, for example, by its co-ordinates at one corner (e.g., upper left), a width and a height (i.e., [x, y] upper left, wide, high]). Other suitable representations for a bounding box are also possible. For example, the bounding box may be represented by coordinates of the corners along a diagonal (e.g., (x1, y1), (x2, y2)] where (x1, y1) defines the coordinate of the lower left corner and (x2, y2) defines the coordinate of the upper right corner). While rectangular bounding boxes are used for convenience, other forms of bounding boxes can also be used (e.g., elliptical).

Adjacent boxes can then be merged in step 412. Ideally, after merging a bounding box will be the smallest bounding box that contains all pixels of the overlapping bounding boxes. To encourage merging of nearby bounding boxes, bounding boxes may be "stretched" (e.g., by increasing their widths and heights) to create overlaps. Stretching also helps in transforming certain bounding boxes to forms that are more easily classified. Often, the resulting merged bounding box entirely encapsulates the object of interest, which enhances the chance of accurate classification. In some embodiments, the stretch parameters, which are multiplicative factors for width and height, may be empirically determined. Multiple passes may need to be carried out over the overlapping bounding boxes, until the output set of bounding boxes are non-overlapping.

Shape based region filtering is provided by module 419. Images received from module 413 are subjected to a bounding box shape check 414 in which ratio of white/black pixels are detected and used for filtering. Any bounding boxes not rejected are passed through a shape aspect or size filter 416 that rejects, for example, overly high aspect ratio bounding boxes, or too small or large bounding boxes. For example, to detect a pedestrian, bounding boxes having an aspect ratio less than 1.0 may be retained. Similarly, to detect a vehicle, bounding boxes having an aspect ratio that is greater than 1.0 may be retained. Too small of bounding boxes are likely to correspond to individual pixels or tiny blobs, rather than objects of interests. Such bounding boxes may result from noise, for example, or from small changes in the lighting conditions, rather than an actual object moving across the scene, and may be safely removed. Large bounding boxes that are larger than a predetermined maximum area (e.g., half the image) are likely to have resulted from exception conditions, e.g., someone tampering with the camera, or glitches in the input image stream, rather than an object of interest moving across the camera's field of vision.

In a next step, a spatial location filter 418 is used to reject bounding boxes at the edge of video frame, or within predetermined regions within the frame unlikely to present valid objects that need classification or identification.

After processing by shape-based filtering module 419, a module 425 is used to apply temporal filters. An object motion analysis module 420 can be used identify physically unrealistic motion tracks and provide filtering. In addition, an object tracker module 422 can be used to eliminate bounding boxes that are not tracked in multiple frames. Only foreground regions that have passed through the shape and temporal filtering are identified as regions of interest (ROI) in bounding boxes (step 424), and passed to object detection, classification, and/or identification processing modules.

It will be understood that shape and temporal filters can be modular, with the output of one filter used as input to any another filter, such that any number or type of filters can be used in any suitable arrangement. Described filters can be omitted or modified, and other shape or temporal filters not described herein can also be used. In some embodiments, non-temporal or shape filters can also be used, including color filters, spectral filters, noise filters, wavelet-based filters, or any other suitable filtering system.

It will also be understood that object detection, classification, and/or identification processing modules object can be used for fitting objects into predetermined categories, such as "human", "car", "package", "pedestrian", "pet", "others", or the special "none" category. The "none" category contains objects that are determined to be "none of the above" or none of the previously defined categories. Persons can be specifically identified by using facial recognition or other suitable procedures. Conventional machine learning systems can be used for classification and identification, including support vector machines, neural networks, convolutional neural networks, and recurrent neural networks.

The foregoing described system can be used for security applications, including home, retail, or commercial security monitoring, as well as building or governmental security. Both outdoor and indoor applications are supported. In some embodiments, use in either a manually operated or autonomous vehicle is possible. This can include, but is not limited to, use in conjunction with automobiles, commercial trucks, ships, airplanes, or aerial drones. Use with teleoperated or autonomous robots is also possible.

Figure 5:
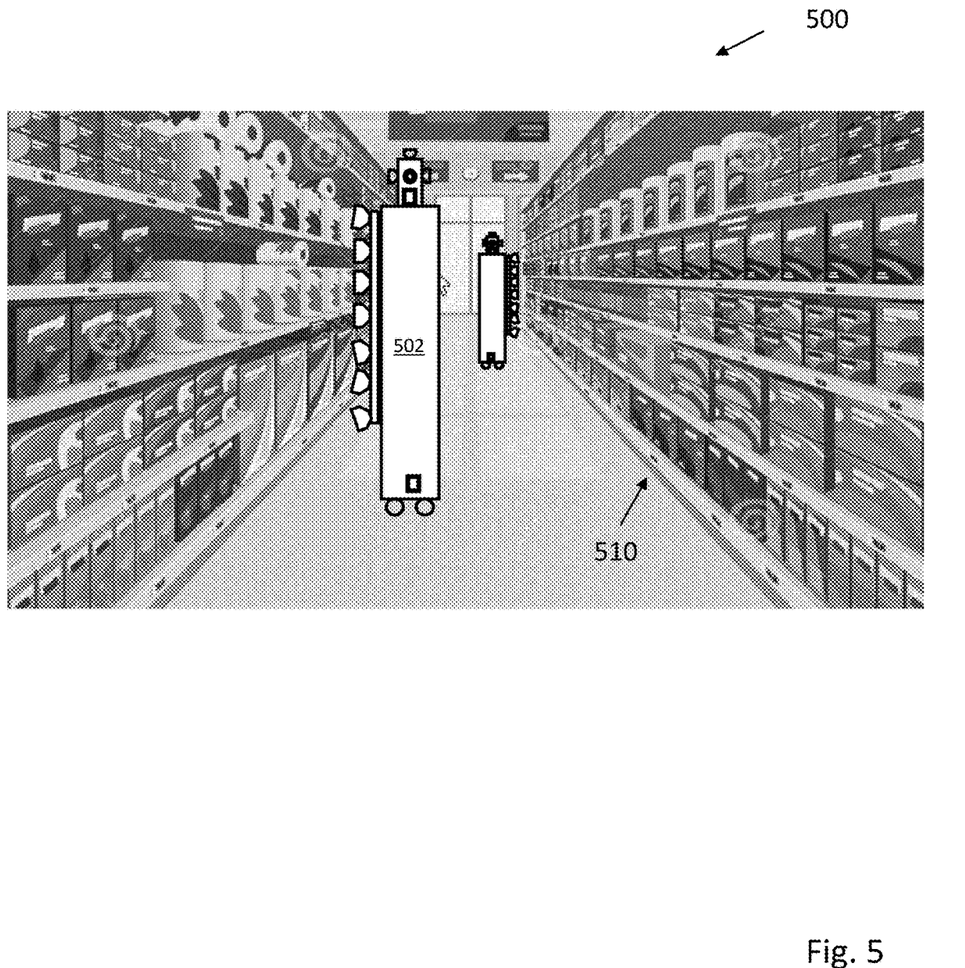
FIG. 5 illustrates mounting of the described camera system on an autonomous robot.

FIG. 5 is an illustration 500 of an autonomous robot 502 capable of supporting a camera system such as described with respect to FIG. 2. The robot 502 can act as an inventory monitoring camera system able to track product changes in retail stores including aisle shelves 510. Such a system can benefit from the computationally efficient method described herein for distinguishing objects such as persons or shopping carts in motion.

The robot 502 can include a navigation and object sensing suite that is capable of independently navigating and moving throughout a building. The robot has multiple cameras attached to movable base by a vertically extending camera support. Lights can be positioned to direct light toward target. In certain embodiments, image sensors can be depth sensors that infer depth from stereo images, project an infrared mesh overlay that allows rough determination of object distance in an image, or that infer depth from the time of flight of light reflecting off the target. In other embodiments, cameras and various image processing algorithms such as described herein can be used for identifying potential object movement and type (e.g. a person moving along an aisle in a store).

Figure 6:
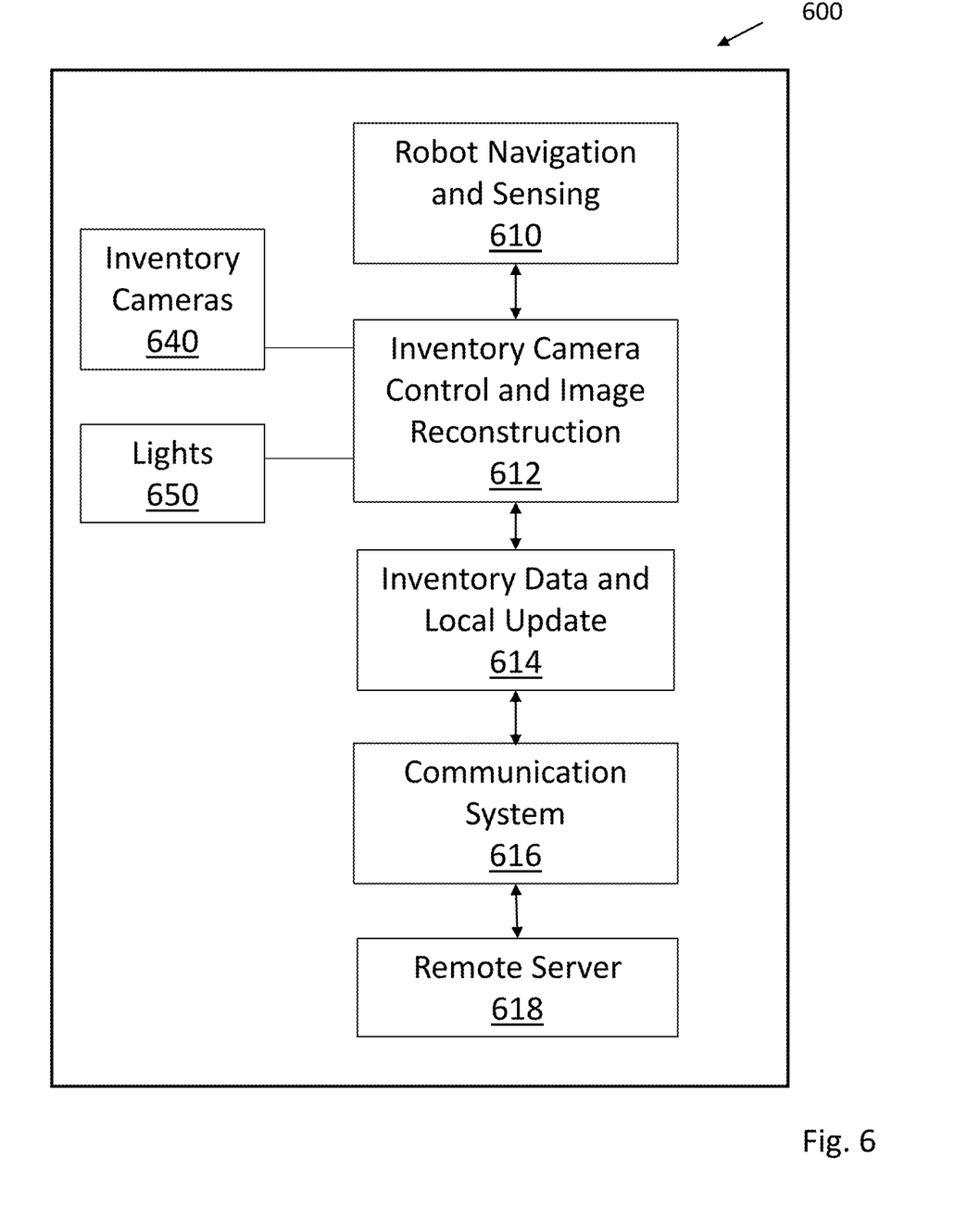
FIG. 6 illustrates various modules of an autonomous robot capable of supporting the described camera system.

FIG. 6 is an illustration of various systems and electronic modules 600 supported by an autonomous robot having robot navigation and sensing 610. In addition to object motion cameras, high resolution inventory cameras 640 can be used to monitor product inventory. Lights 650 can be directed toward product inventory and inventory camera control and image reconstruction 612 takes a series of inventory photos (and optional depth measurements) that can be stitched together. Panoramic images or other inventory related information is handled by an inventory data and local update module 614, which can transmit or receive relevant information via communication system 616. Data can be communicated to a server local to the store or transmitted by suitable internet or networking devices to remote servers or cloud accessible data sites.

Inventory data 614 can include but is not limited to an inventory database capable of storing data on a plurality of products, each product associated with a product type, product dimensions, a product 3D model, a product image and a current product price, shelf location, shelf inventory count and number of facings. Product images captured and created at different times can be stored, and data analysis used to improve estimates of product availability. In certain embodiments, frequency of image creation can be increased or reduced.

The communication system 616 can include connections to either a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Remote server 618 can include, but is not limited to servers, desktop computers, laptops, tablets, or smart phones. Remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In certain embodiments, processing related to one or more of video frame preprocessing, motion detection, change detection, bounding box creation, filtering of potential objects, or classification/identification can be performed at a remote server. For example, local processing on an autonomous robot or fixed camera can be used for video frame preprocessing, motion detection, change detection, bounding box creation, and filtering of potential objects. Computationally difficult object classification/identification can be done using the remote server or other cloud computing facility.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A video monitoring method, comprising:
determining motion changes in a set of video frames;
identifying a plurality of potentially interesting objects in the set of video frames based on the determined motion changes;
defining a plurality of bounding boxes, including defining a bounding box around each of the plurality of potentially interesting objects;
filtering out at least one bounding box, from among the plurality of bounding boxes, based on spatial and temporal filter settings, including identifying physically unrealistic motion tracks and identifying bounding boxes within predetermined frame regions unlikely to present valid objects, leaving at least one other remaining bounding box;
eliminating potentially interesting objects surrounded by any of the at least one filtered out bounding box from further consideration as interesting objects; and
classifying potentially interesting objects surrounded by any of the at least one other remaining bounding box.

2. The video monitoring method of claim 1, wherein the video frames are preprocessed to reduce at least one of color depth and resolution.

3. The video monitoring method of claim 1, wherein filtering out at least one bounding box comprises:
   filtering out a first bounding box, from among the plurality of bounding boxes, based on spatial filter settings, leaving a sub-plurality of bounding boxes; and
   subsequently filtering out a second bounding box, from among the sub-plurality of bounding boxes, based on temporal filter settings, leaving the at least one other remaining bounding box.

4. The video monitoring method of claim 1, wherein determining motion changes further comprises frame subtraction and morphological processing.

5. The video monitoring method of claim 1, wherein defining a plurality of bounding boxes comprises fitting shape contours, fitting minimum bounding rectangles, and merging adjacent boxes.

6. The video monitoring method of claim 1, wherein filtering out at least one bounding box comprises filtering the plurality of bounding boxes based on: bounding box shape, bounding box size, bounding box aspect ratio, and bounding box spatial location.

7. The video monitoring method of claim 1, wherein filtering out at least one bounding box comprises filtering the plurality of bounding boxes based on: object motion analysis and object tracking.

8. The video monitoring method of claim 1, wherein classifying potentially interesting objects comprises classifying objects using machine learning.

9. The video monitoring method of claim 1, further comprising using a stationary camera to acquire the set of video frames.

10. The video monitoring method of claim 1, further comprising using a movable camera to acquire the set of video frames.

11. The video monitoring method of claim 1, wherein classifying potentially interesting objects comprises classifying a shopping cart in motion.

12. The video monitoring method of claim 1, further comprising using a camera mounted on an autonomous robot to acquire the set of video frames.

13. A video monitoring system, comprising:
   a processor; and
   system memory coupled to the processor and storing instructions configured to cause the processor to:
      determine motion changes in a set of video frames;
      identify a plurality of potentially interesting objects in the set of video frames based on the determined motion changes;
      defines a plurality of bounding boxes, including defining a bounding box around each of the plurality of potentially interesting objects;
      filter out at least one bounding box, from among the plurality of bounding boxes, based on spatial and temporal filter settings, including identifying physically unrealistic motion tracks and identifying bounding boxes within predetermined frame regions unlikely to present valid objects, leaving at least one other remaining bounding box;
      eliminate potentially interesting objects surrounded by any of the at least one filtered out bounding box from further consideration as interesting objects; and
      classify potentially interesting objects surrounded by any of the at least one other remaining bounding box.

14. The video monitoring system of claim 13, further comprising instructions configured to preprocess the video frames reducing at least one of color depth and resolution.

15. The video monitoring system of claim 13, wherein instructions configured to filter out at least one bounding box comprise instructions configured to:
   filter out a first bounding box, from among the plurality of bounding boxes, based on spatial filter settings, leaving a sub-plurality of bounding boxes; and
   subsequently filter out a second bounding box, from among the sub-plurality of bounding boxes, based on temporal filter settings, leaving the at least one other remaining bounding box.

16. The video monitoring system of claim 13, wherein instructions configured to determine motion changes comprise instructions configured to perform frame subtraction and morphological processing.

17. The video monitoring system of claim 13, wherein instructions configured to define a plurality of bounding boxes comprise instructions configured to perform shape contours fitting, minimum bounding rectangles fitting, and adjacent boxes merging.

18. The video monitoring system of claim 13, wherein instructions configured to filter out at least one bounding box comprise instructions configured to filter the plurality of bounding boxes based on: bounding box shape, bounding box size, bounding box aspect ratio, and bounding box spatial location.

19. The video monitoring system of claim 13, wherein instructions configured to filter out at least one bounding box comprise instructions configured to filter the plurality of bounding boxes based on: object motion analysis and object tracking.

20. A video monitoring system, comprising:
   a camera system attached to an autonomous robot;
   a processor; and
   system memory coupled to the processor and storing instructions configured to cause the processor to:
      capture a set of video frames at the camera system;
      determine motion changes in the set of video frames;
      identify a plurality of potentially interesting objects in the set of video frames based on the determined motion changes;
      define a plurality of bounding boxes, including defining a bounding box around each of the plurality of potentially interesting objects;
      filter out at least one bounding box, from among the plurality bounding boxes, based on spatial and temporal filter settings, including identifying physically unrealistic motion tracks and identifying bounding boxes within predetermined frame regions unlikely to present valid objects, leaving at least one other remaining bounding box;
      eliminate potentially interesting objects surrounded by any of the at least one filtered out bounding box from further consideration as interesting objects; and
      classify potentially interesting objects surrounded by any of the at least one other remaining bounding box.

\* \* \* \* \*